United States Patent
Kimura

(10) Patent No.: US 7,840,183 B2
(45) Date of Patent: Nov. 23, 2010

(54) SHORT-RANGE WIRELESS COMMUNICATION DEVICE

(75) Inventor: Sadahiro Kimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 657 days.

(21) Appl. No.: 11/700,917

(22) Filed: Feb. 1, 2007

(65) Prior Publication Data

US 2007/0213091 A1  Sep. 13, 2007

(30) Foreign Application Priority Data

Feb. 3, 2006 (JP) .............................. 2006-027253

(51) Int. Cl.
*H04B 7/00* (2006.01)
(52) U.S. Cl. ..................... 455/41.2; 455/41.3
(58) Field of Classification Search ................ 455/41.2, 455/41.3, 556.1, 557, 41.1; 370/376, 458, 370/459, 508
See application file for complete search history.

(56) References Cited

U.S. PATENT DOCUMENTS 7,542,784 B2 * 6/2009 Passier et al. ............... 455/557
7,583,644 B2 * 9/2009 Morioka et al. ............. 370/338

FOREIGN PATENT DOCUMENTS

| JP | 11-146454 | 5/1999 |
|---|---|---|
| JP | 2004-512705 | 4/2004 |
| JP | 2004-364257 | 12/2004 |
| JP | 2005-252897 | 9/2005 |

* cited by examiner

*Primary Examiner*—Eugene Yun
(74) *Attorney, Agent, or Firm*—Dickstein Shapiro LLP

(57) ABSTRACT

A short-range wireless communication device is disclosed that is able to ensure QoS of a communication and reduce power consumption by controlling allocation of a period occupied by the communication and by controlling a communication rate within the period occupied by the communication. The short-range wireless communication device receives or transmits beacons in a beacon period, allocates a communication-occupied interval in a super-frame between two adjacent beacon periods, and carries out a communication in the communication-occupied interval in conformity with a predetermined protocol. The short-range wireless communication device includes a control unit that dynamically sets and changes a communication rate in the communication-occupied interval and a number of slots constituting the communication-occupied interval.

7 Claims, 9 Drawing Sheets

FIG.3A

| required band | 480M |
|---|---|
| link rate (bps) | required number of DRP |
| 480M | 1 |
| 400M | 2 |
| 320M | 2 |
| 200M | 3 |
| 160M | 3 |
| 106M | 4 |
| 80M | 6 |
| 53M | 10 |

FIG.3B

| required band | 400M |
|---|---|
| link rate (bps) | required number of DRP |
| 480M | 1 |
| 400M | 1 |
| 320M | 2 |
| 200M | 2 |
| 160M | 3 |
| 106M | 4 |
| 80M | 5 |
| 53M | 8 |

FIG.3C

| required band | 300M |
|---|---|
| link rate (bps) | required number of DRP |
| 480M | 1 |
| 400M | 1 |
| 320M | 1 |
| 200M | 2 |
| 160M | 3 |
| 106M | 3 |
| 80M | 4 |
| 53M | 6 |

FIG.3D

| required band | 200M |
|---|---|
| link rate (bps) | required number of DRP |
| 480M | 1 |
| 400M | 1 |
| 320M | 1 |
| 200M | 1 |
| 160M | 2 |
| 106M | 2 |
| 80M | 3 |
| 53M | 4 |

FIG.7

| distance | link rate (bps) | DRP |
|---|---|---|
| 1m | 480M | 1 |
| 2m | 480M | 1 |
| 3m | 400M | 1 |
| 4m | 320M | 2 |
| 5m | 200M | 2 |
| 6m | 160M | 3 |
| 7m | 106M | 4 |
| 8m | 80M | 5 |
| 9m | 53M | 8 |
| > 10m | 53M | 8 |

(required band 400 Mbps)

FIG.9

| distance | link rate (bps) | DRP | transmission level |
|---|---|---|---|
| 1m | 480M | 1 | 0 |
| 2m | 480M | 1 | 0 |
| 3m | 400M | 1 | 1 |
| 4m | 320M | 2 | 2 |
| 5m | 200M | 2 | 3 |
| 6m | 160M | 3 | 4 |
| 7m | 106M | 4 | 5 |
| 8m | 80M | 5 | 6 |
| 9m | 53M | 8 | 7 |
| > 10m | 53M | 8 | 7 |

(required band 400 Mbps)

SHORT-RANGE WIRELESS COMMUNICATION DEVICE

BACKGROUND OF THE INVENTION

1. Field of the Invention

The present invention relates to a short-range wireless communication device such as a wireless USB (Universal Serial Bus).

2. Description of the Related Art

Along with progress in the wireless technology, cable connection in the related art is more and more replaced by radio connection. For example, in the related art, a LAN (Local Area Network) is primarily connected using an Ethernet, typically, the IEEE 802.3 (the Institute of Electrical and Electronic Engineers 802.3) system. However, recently, more and more information communication apparatuses are typically connected using the IEEE 802.11 wireless LAN standard.

This is true not only for LANs, but also for PANs (Personal Area Network) for close range communications. A USB is a typical example. At the present time, since the USB can be used to configure an inexpensive and stable PAN, usage of the USB is widely spread. In order to further improve convenience of usage of the USB, a wireless USB is more and more required. It is expected that because of its characteristics, the wireless USB will be more and more in demand in the audio and video fields in the future.

A TDMA (Time Division Multiple Access) scheme is used in communication through the wireless USB. It is well-known that the TDMA scheme is used in a PHS (Personal Handy phone System). In the TDMA used for the PHS, however, since the time slot is fixed, if the data rate decreases due to errors, it is difficult to maintain QoS (Quality of Service). Thus, if the TDMA scheme used in the PHS is applied to the communication through the wireless USB, the communication quality may degrade. This is because the communication through the wireless USB is different from the audio communication (phone call) in the PHS, and it is expected that a large variety of applications requiring a large capacity and real-time QoS will be involved in communications through the wireless USB.

In the above-mentioned wireless LAN system, the concept of QoS is introduced in the IEEE 802.11e standard to ensure a transmission rate. This technique is disclosed, for example, in Japanese Laid-open Patent Application No. 2005-252897 (hereinafter, referred to as "reference 1"), and Japanese Laid-open Patent Application No. 2004-512705 (hereinafter, referred to as "reference 2"). In the communications through the wireless USB, however, the technique of ensuring the QoS is not yet established.

The communication through the wireless USB is performed in a super-frame.

FIG. 1 is a data diagram illustrating a configuration of a super-frame for the communication through the wireless USB.

As shown in FIG. 1, a super-frame is a time interval of 65 ms, which includes 256 MASs (Media Access Slot), each MAS being an elementary unit of a beacon period and a communication time slot. During the communication through the wireless USB, an arbitrary number of the MASs are occupied by the communication to constitute a DRP (Distributed Reservation Protocol), and data transmission and reception are carried out within the "communication-occupied period". For example, Japanese Laid-open Patent Application No. 2004-364257 (hereinafter, referred to as "reference 3") discloses a technique for efficiently allocating the DRP. The technique in reference 3, however, is related to mediation between applications at an upper level, which applications use the wireless USB, and this technique cannot meet the requirements of the QoS.

Japanese Laid-open Patent Application No. 11-146454 (hereinafter, referred to as "reference 4") discloses a digital wireless communication system able to prevent communication failure caused by a busy state of a connection between a main phone and a cordless phone.

As described above, in the communications through the wireless USB, the technique of ensuring the QoS is not yet established, and it is difficult to carry out stable communications. In addition, most devices used in the communications through the wireless USB are driven by batteries, and thus it is desirable to reduce power consumption of devices used in the wireless USB communication system.

SUMMARY OF THE INVENTION

An embodiment of the present invention may solve one or more problems of the related art.

A preferred embodiment of the present invention may provide a short-range wireless communication device, such as a wireless USB, which is able to ensure QoS of a communication and reduce power consumption by controlling allocation of a period occupied by the communication and by controlling a communication rate within the period occupied by the communication.

According to a first aspect of the present invention, there is provided a short-range wireless communication device that receives or transmits beacons in a beacon period, arbitrarily allocates a communication-occupied interval in a super-frame between two adjacent beacon periods, and carries out a communication in the communication-occupied interval in conformity with a predetermined protocol, said short-range wireless communication device comprising:

a control unit that dynamically sets and changes a communication rate in the communication-occupied interval and a number of slots constituting the communication-occupied interval.

As an embodiment, the control unit refers to a table prepared beforehand in the short-range wireless communication device, changes allocation of the slots constituting the communication-occupied interval in response to the communication rate in the communication-occupied interval, and maintains a communication band to be constant.

As an embodiment, the control unit sets the allocation of the slots constituting the communication-occupied interval to be a possible minimum in response to the amount of data to be transmitted.

As an embodiment, the control unit changes the communication rate in the communication-occupied interval or the allocation of the slots constituting the communication-occupied interval in response to the distance to a device coupled to the short-range wireless communication device through a radio connection.

As an embodiment, the control unit changes transmission power in response to the distance to a device coupled to the short-range wireless communication device through a radio connection.

According to a second aspect of the present invention, there is provided a short-range wireless communication method, comprising the steps of receiving or transmitting beacons in a beacon period; arbitrarily allocating a communication-occupied interval in a super-frame between two adjacent beacon periods; carrying out a communication in the communication-occupied interval in conformity with a predetermined protocol; and dynamically setting and changing a communication rate in the communication-occupied interval and the number of slots constituting the communication-occupied interval.

According to the above present invention, it is possible to provide a short-range wireless communication device, such as a wireless USB, which is able to ensure QoS of a communication and reduce power consumption by controlling allocation of a period occupied by the communication and by controlling a communication rate within the period occupied by the communication.

These and other objects, features, and advantages of the present invention will become more apparent from the following detailed description of preferred embodiments given with reference to the accompanying drawings.

BRIEF DESCRIPTION OF THE DRAWINGS

FIG. 3A through FIG. 3D illustrate examples of the DRP-link rate correction tables;

FIG. 7 illustrates an example of the distance table;

FIG. 9 illustrates an example of the distance table.

DESCRIPTION OF THE PREFERRED EMBODIMENTS

Below, preferred embodiments of the present invention are explained with reference to the accompanying drawings.

First Embodiment

Figure 1:
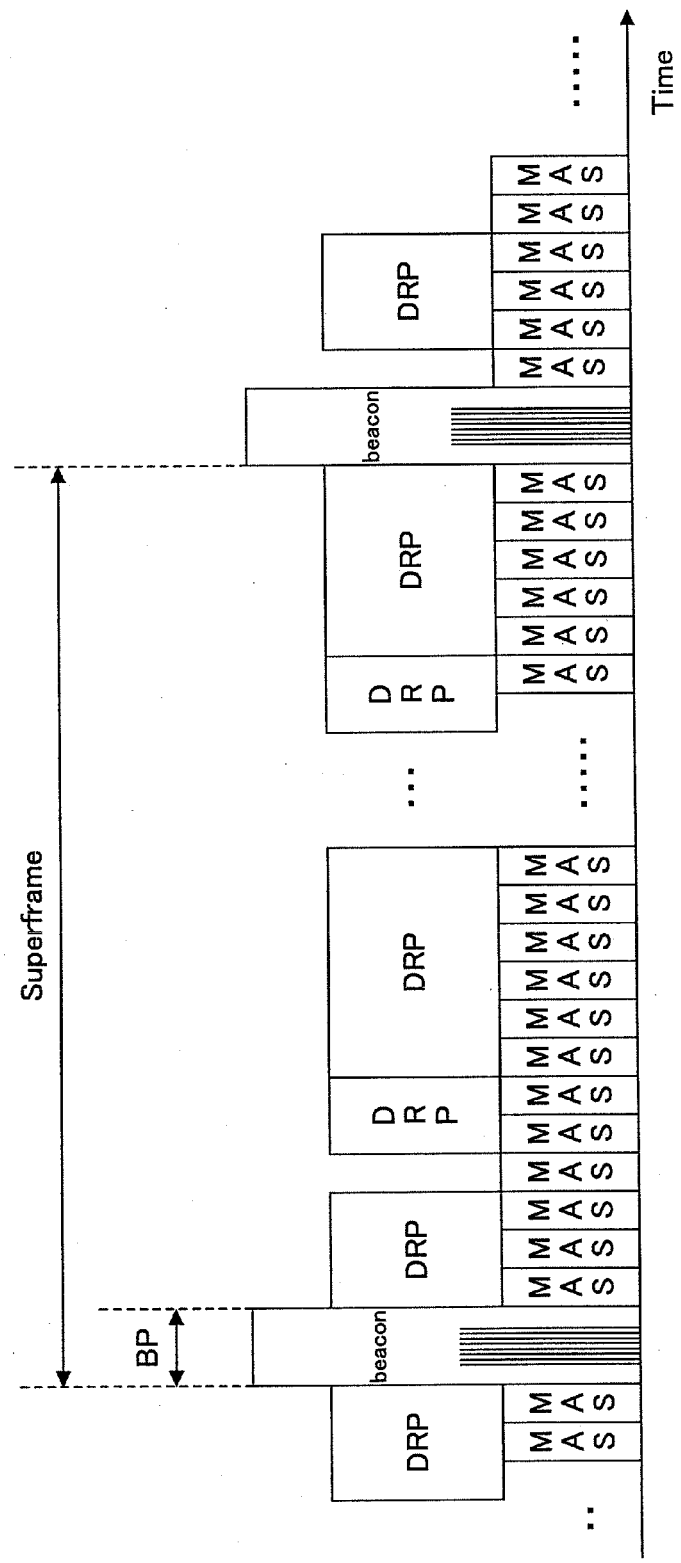
FIG. 1 is a data diagram illustrating a configuration of a super-frame for the communication through the wireless USB.
Figure 2:
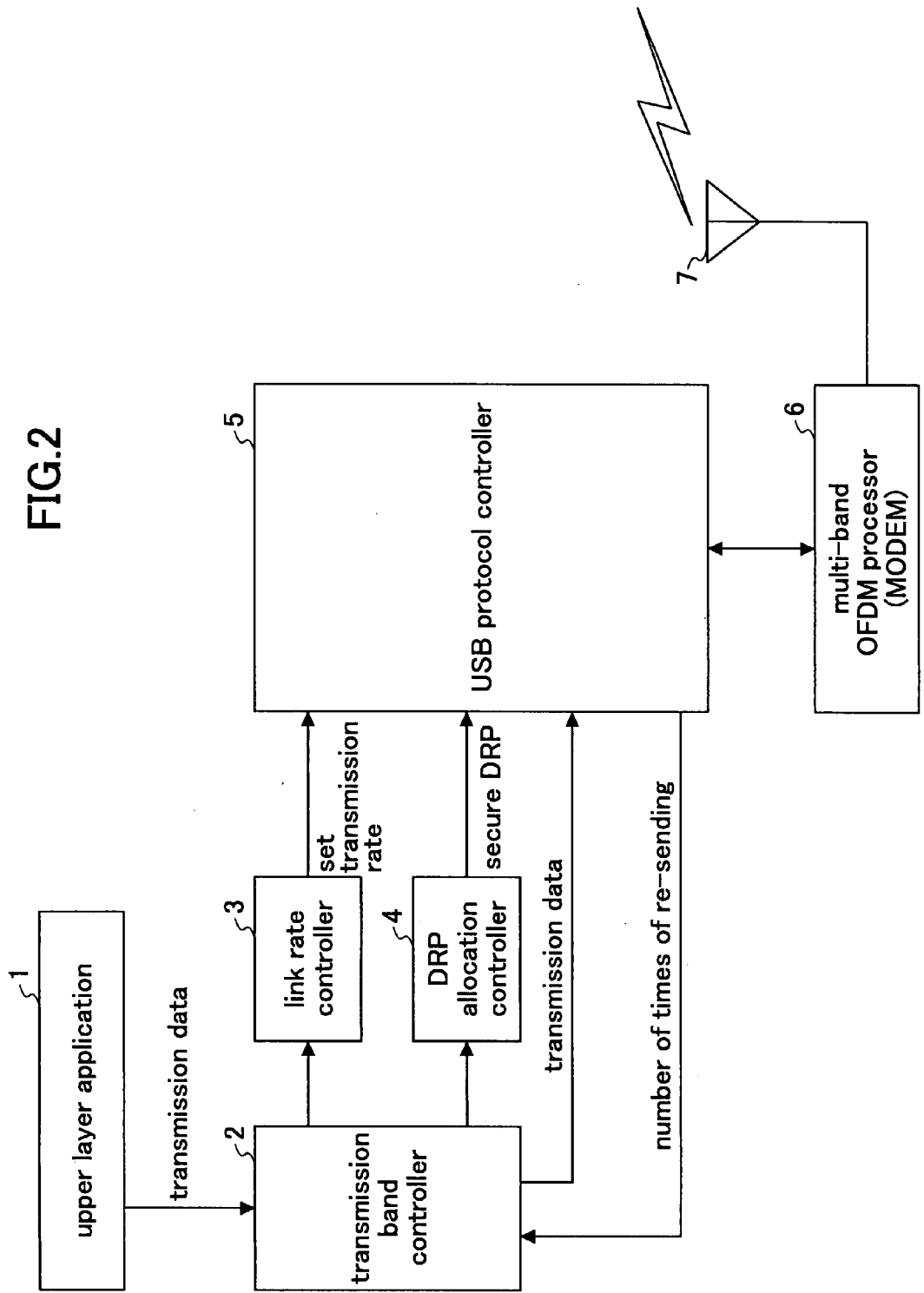
FIG. 2 is a block diagram illustrating a configuration of a wireless USB device according to a first embodiment of the present invention.

FIG. 2 is a block diagram-illustrating a configuration of a wireless USB device according to a first embodiment of the present invention.

The wireless USB device shown in FIG. 2 includes an upper layer application 1 which holds transmission data, such as a MPEG (Moving Picture Coding Expert Group) stream, a transmission band controller 2 which receives data from the upper layer application 1 and calculates a transmission band required for transmitting the received data, a link rate controller 3 which determines a link rate in a physical layer, a DRP allocation controller 4 which controls allocation of DRPs, a USB protocol controller 5 which receives and transmits logic data in a wireless USB and controls re-sending and various procedures, a multi-band OFDM processor (MODEM) 6 which forms the physical layer of the wireless USB and includes RF. (Radio Frequency) blocks, and an antenna 7 which receives and transmits radio electrical waves.

Below, descriptions are made of operations of the wireless USB device shown in FIG. 2.

First, the transmission band controller 2 receives data (below, referred to as "transmission data") from the upper layer application 1, and calculates the transmission band required for transmitting the transmission data. For example, when transmitting a MPEG stream, in order to secure a margin for the maximum MPEG data rate in advance, the transmission band controller 2 overestimates the transmission band by 30%.

Next, the transmission band controller 2 fixes a DRP (Distributed Reservation Protocol) interval beforehand, sets the value of the DRP interval into the DRP allocation controller 4, and at the same time, determines a link rate at the physical layer required for exactly transmitting the transmission data in the fixed DRP interval, then sets the value of the link rate into the link rate controller 3. In wireless signal transmission and reception, the value of the allocated DRP (namely, the number of MAS in the allocated DRP) and the value of the link rate at the physical layer are used to describe the status of the settings in the DRP allocation controller 4 and the link rate controller 3. Here, the value of the allocated DRP equals A (namely, the number of MAS in the allocated DRP is A), and the value of the link rate at the physical layer equals X.

Under this condition, the transmission band controller 2 then transfers the transmission data, which are received from the upper layer application 1, to the USB protocol controller 5. The USB protocol controller 5 performs processing for data transmission at the specified DRP (A) and the specified link rate (X), and transmits data through the multi-band OFDM processor 6 and the antenna 7. In this process, if communication errors occur between the wireless USB device shown in FIG. 2 and its counter part communication device, for example, due to packet loss, the USB protocol controller 5 performs processing for re-sending the data transmission and feeds back the number of times re-sending to the transmission band controller 2.

In the wireless signal transmission, if there are few communication errors, and the number of times re-sending is less than a preset value, which is determined from a maximum data rate securing a margin of 30%, the transmission band controller 2 maintains the current link rate and DRP allocation. However, if the number of times re-sending is greater than the preset value, the transmission band controller 2 accesses a DRP-link rate correction table stored in the short-range wireless communication device beforehand, and changes the current link rate and DRP allocation pursuant to the DRP-link rate correction table.

FIG. 3A through FIG. 3D illustrate examples of the DRP-link rate correction tables.

As shown in FIG. 3A through FIG. 3D, corresponding to the required band, the link rates are associated with the required number of DRPs.

As an example of changes of the link rate and the DRP allocation, the transmission band controller 2 controls the link rate controller 3 to change the link rate from 480 Mbps to 200 Mbps. In addition, pursuant to the DRP-link rate correction table, the transmission band controller 2 controls the DRP allocation controller 4 to set the DRP allocation to be three, which is the required number of DRPs at the link rate of 200 Mbps.

Preferably, the DRP-link rate correction table satisfies the following relationship, required band≦link rate≦required number of DRPs Under this condition, even when the link rate decreases, it is possible to secure the required band.

As described above, when the link rate decreases, the transmission time (DRP) compensates for this; thereby, the transmission band for the total transmission data is secured, and thus it is possible to perform stable data transmission.

Second Embodiment

Figure 4:
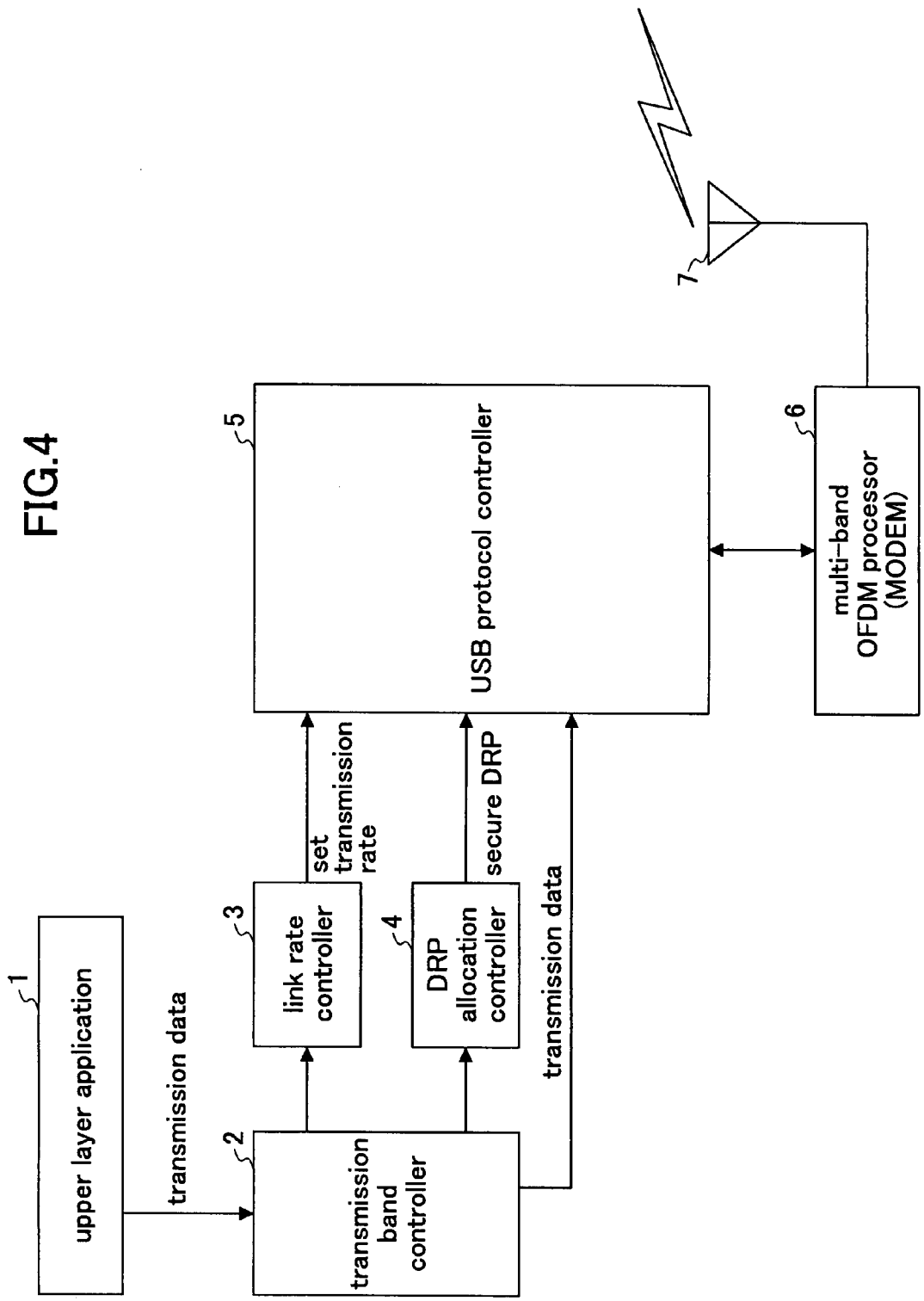
FIG. 4 is a block diagram illustrating a configuration of a wireless USB device according to a second embodiment of the present invention.

FIG. 4 is a block diagram illustrating a configuration of a wireless USB device according to a second embodiment of the present invention.

Note that in this embodiment, the same reference numbers are assigned to the same elements as described previously.

The wireless USB device shown in FIG. 4 includes an upper layer application 1 which holds transmission data, such as a MPEG stream, a transmission band controller 2 which receives data from the upper layer application 1 and calculates a transmission band required for transmitting the received data, a link rate controller 3 which determines a link rate in a physical layer, a DRP allocation controller 4 which controls allocation of DRPs, a USB protocol controller 5 which receives and transmits logic data in a wireless USB and controls re-sending and various procedures, a multi-band OFDM processor (MODEM) 6 which forms the physical layer of the wireless USB and includes RF (Radio Frequency) blocks, and an antenna 7 which receives and transmits radio electrical waves.

Below, descriptions are made of operations of the wireless USB device shown in FIG. 4.

Assume that a MPEG stream to be transmitted is encoded at variable rates.

The transmission band controller 2 receives data (below, referred to as "transmission data") from the upper layer application 1, and reads out a coding rate (variable value) of the frame. This coding rate is set into the link rate controller 3, and at the same time, the transmission band controller 2 calculates a minimum DRP required for transmission at this coding rate, and sets the minimum DRP into the DRP allocation controller 4.

Under these conditions, the transmission band controller 2 transfers the transmission data, which are received from the upper layer application 1, to the USB protocol controller 5. The USB protocol controller 5 performs processing for data transmission at the specified DRP and the specified link rate, and transmits data through the multi-band OFDM processor 6 and the antenna 7.

Figure 5:
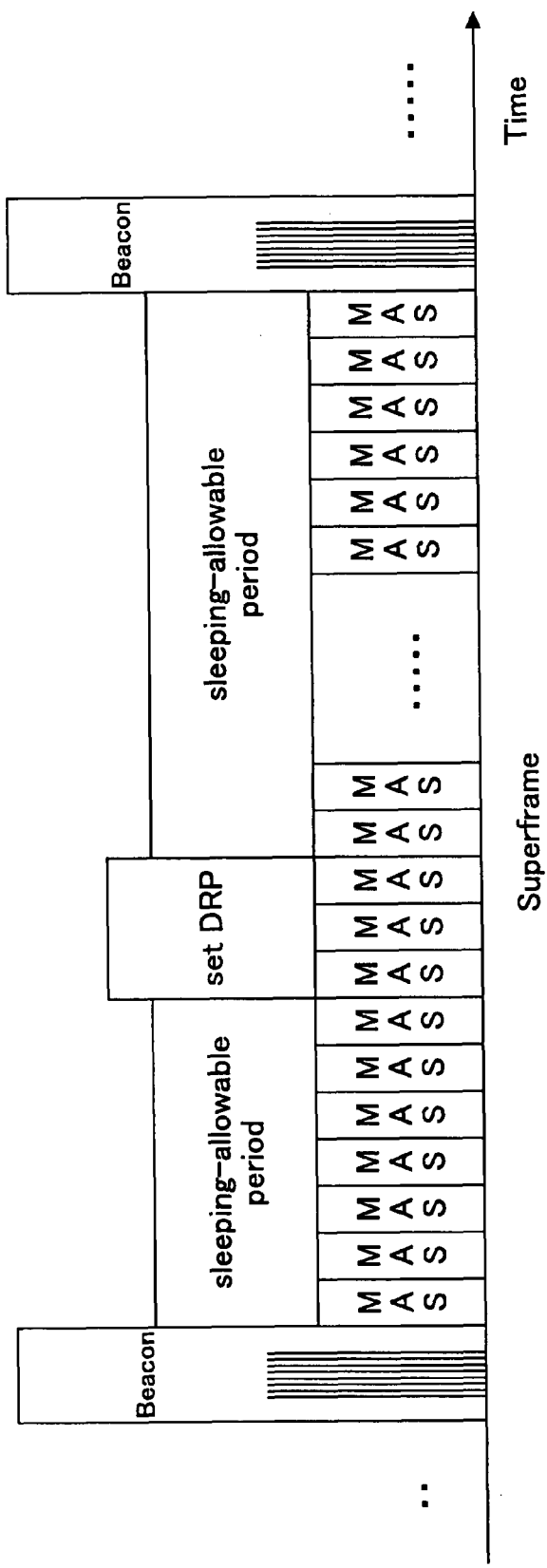
FIG. 5 is a data diagram illustrating a configuration of a super-frame according to the second embodiment of the present invention.

FIG. 5 is a data diagram illustrating a configuration of a super-frame according to the second embodiment of the present invention.

As shown in FIG. 5, since DRP is set to be the minimum, regions other than transmission DRP intervals in the super-frame can sleep, thereby, it is possible to reduce power consumption.

Third Embodiment

Figure 6:
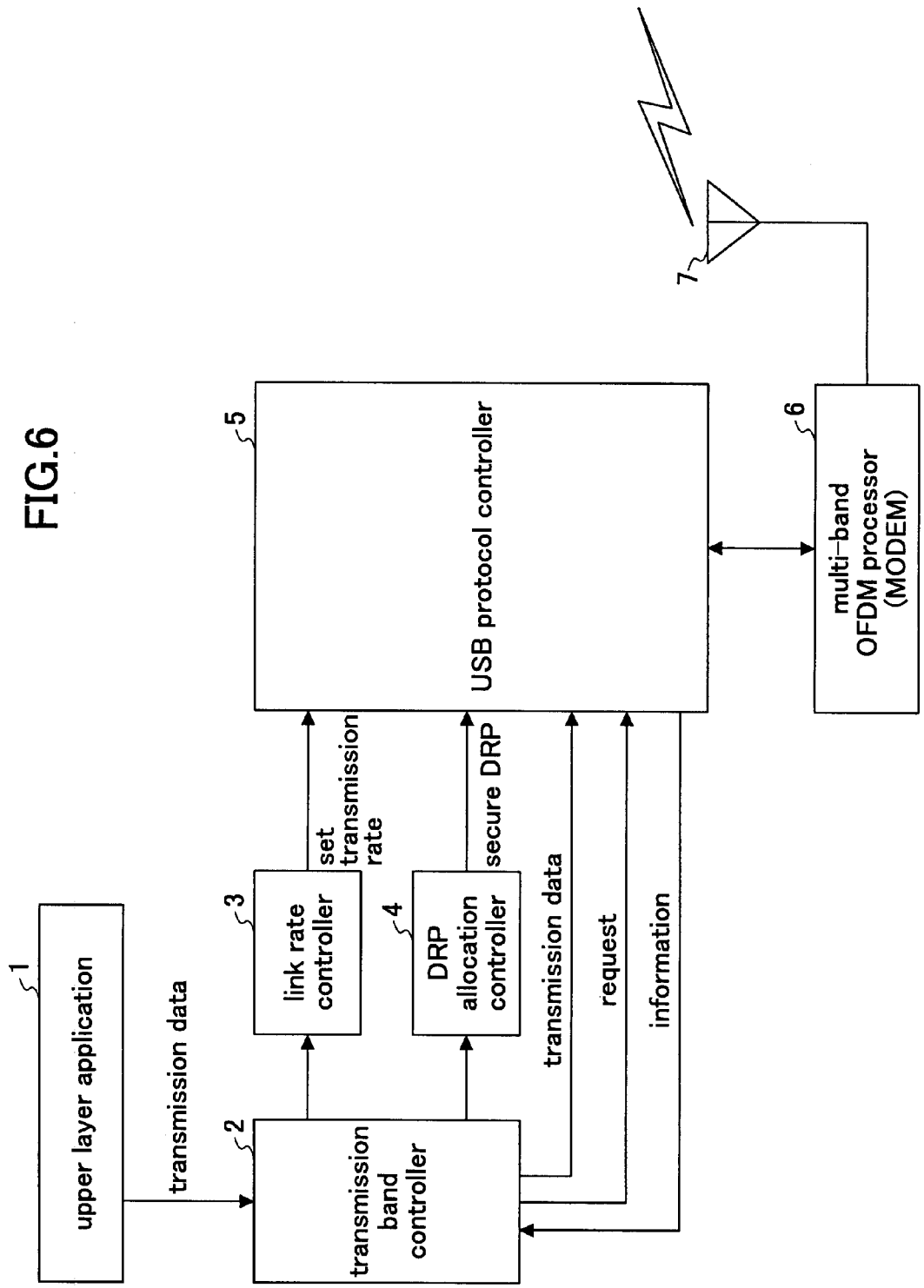
FIG. 6 is a block diagram illustrating a configuration of a wireless USB device according to a third embodiment of the present invention.

FIG. 6 is a block diagram illustrating a configuration of a wireless USB device according to a third embodiment of the present invention.

In this embodiment, the same reference numbers are assigned to the same elements as described previously.

The wireless USB device shown in FIG. 6 includes an upper layer application 1 which holds transmission data, such as a MPEG stream, a transmission band controller 2 which receives data from the upper layer application 1 and calculates a transmission band required for transmitting the received data, a link rate controller 3 which determines a link rate in a physical layer, a DRP allocation controller 4 which controls allocation of DRPs, a USB protocol controller 5 which receives and transmits logic data in a wireless USB and controls re-sending and various procedures, a multi-band OFDM processor (MODEM) 6 which forms the physical layer of the wireless USB and includes RF (Radio Frequency) blocks, and an antenna 7 which receives and transmits radio electrical waves.

Below, descriptions are made of operations of the wireless USB device shown in FIG. 6.

In order to obtain information of a counterpart communication device, the transmission band controller 2 sends a request to the USB protocol controller 5 for acquiring the information of the counterpart communication device. Receiving this request, the USB protocol controller 5 transmits packet signals used for measuring the distance to the counterpart communication device, and performs processing cooperatively with the counterpart communication device (for example, perform protocol processing for measuring the distance); thereby, the distance is obtained. The USB protocol controller 5 sends the thus measured distance to the transmission band controller 2 as the information of the counterpart communication device.

The transmission band controller 2 refers to the measured distance and a distance table stored in the wireless USB device in FIG. 6 beforehand, for example, the distance table is constructed so that the transmission reception error is optimized corresponding to the distance to the counterpart communication device, and appropriately determines the link rate and the DRP. The transmission band controller 2 sets the determined link rate into the link rate controller 3 and the determined DRP into the DRP allocation controller 4, respectively.

FIG. 7 illustrates an example of the distance table.

As shown in FIG. 7, corresponding to the required band (for example, 400 Mbps), the distance to the counterpart communication device, the link rate, and the required number of DRPs are associated with each other.

As described above, since the distance table is configured so that the transmission and reception error is optimized relative to the distance to the counterpart communication device, it is possible to optimize the rate of the communication error, and realize a communication environment having less packet loss.

Fourth Embodiment

Figure 8:
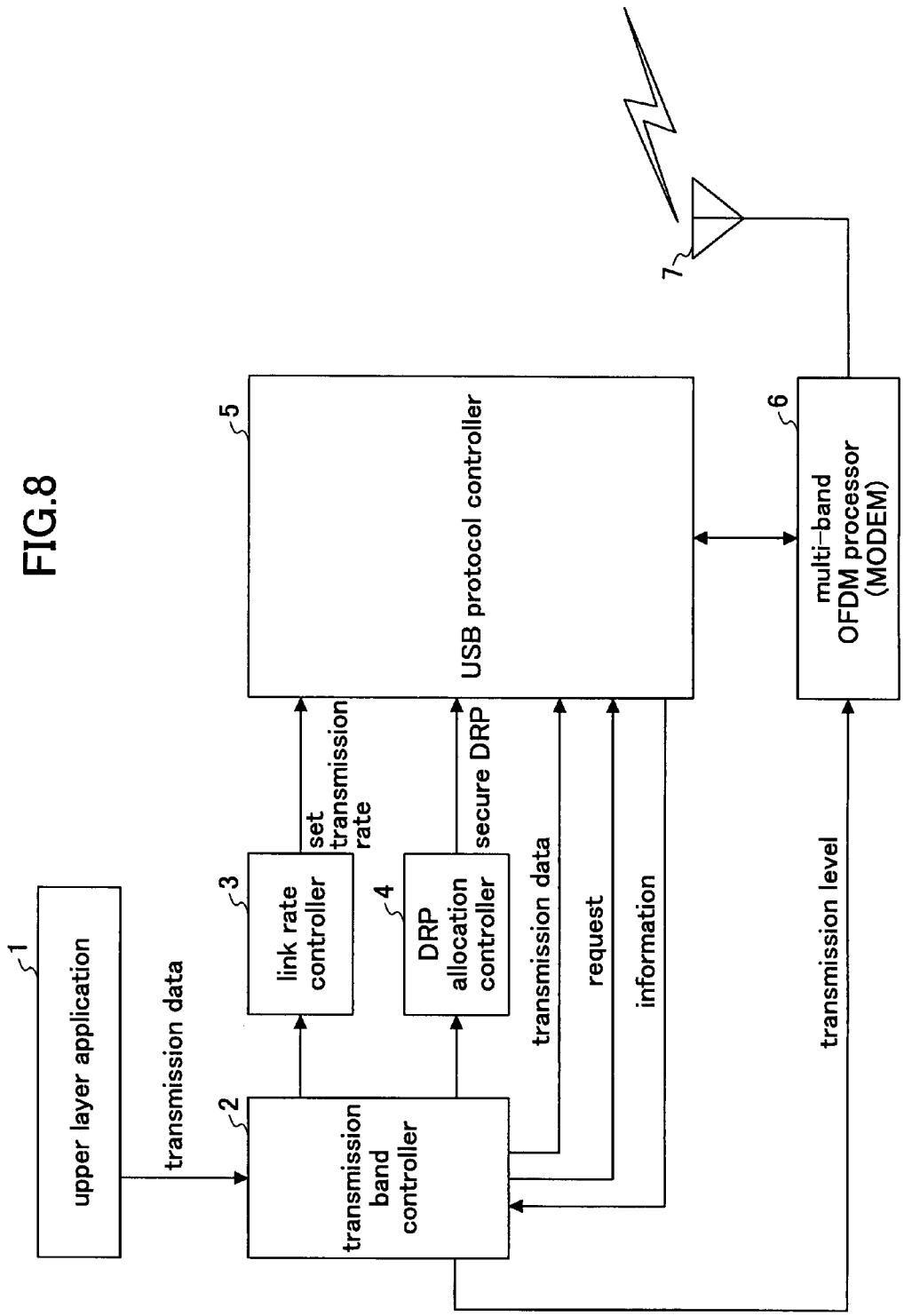
FIG. 8 is a block diagram illustrating a configuration of a wireless USB device according to a fourth embodiment of the present invention.

FIG. 8 is a block diagram illustrating a configuration of a wireless USB device according to a fourth embodiment of the present invention.

In this embodiment, the same reference numbers are assigned to the same elements as described previously.

The wireless USB device shown in FIG. 8 includes an upper layer application 1 which holds transmission data, such as a MPEG stream, a transmission band controller 2 which receives data from the upper layer application 1 and calculates a transmission band required for transmitting the received data, a link rate controller 3 which determines a link rate in a physical layer, a DRP allocation controller 4 which controls allocation of DRPs, a USB protocol controller 5 which receives and transmits logic data in a wireless USB and controls re-sending and various procedures, a multi-band OFDM processor (MODEM) 6 which forms the physical layer of the wireless USB and includes RF (Radio Frequency) blocks, and an antenna 7 which receives and transmits radio electrical waves.

Below, descriptions are made of operations of the wireless USB device shown in FIG. 8.

In order to obtain information of a counterpart communication device, the transmission band controller 2 sends a request to the USB protocol controller 5 for acquiring the information of the counterpart communication device. Receiving this request, the USB protocol controller 5 transmits packet signals used for measuring the distance to the counterpart communication device, and performs processing cooperatively with the counterpart communication device (for example, perform protocol processing for measuring the distance), thereby, the distance is measured. The USB protocol controller 5 sends the measured distance to the transmission band controller 2 as information of the counterpart communication device.

The transmission band controller 2 refers to the measured distance and a distance table stored in the wireless USB device in FIG. 8 beforehand. For example, the distance table is constructed so that the transmission reception error is optimized corresponding to the distance to the counterpart communication device. The transmission band controller 2 then appropriately determines the link rate and the DRP, and further, a transmission level. The transmission band controller 2 sets the determined link rate into the link rate controller 3, the determined DRP into the DRP allocation controller 4, and the determined transmission level into the multi-band OFDM processor 6, respectively.

FIG. 9 illustrates an example of the distance table.

As shown in FIG. 9, corresponding to the required band (for example, 400 Mbps), the distance to the counterpart communication device, the link rate, and the required number of DRPs are associated with each other.

As described above, since the distance table is configured so that the transmission and reception error is optimized relative to the distance to the counterpart communication device, it is possible to optimize the rate of the communication error, and realize a communication environment having less packet loss. Because the transmission level is set appropriately, it is possible to reduce RF current consumption. Namely, since the link rate and the DRP are optimized relative to the distance to the counterpart communication device, it is possible to obtain a communication environment having less packet loss, and since the transmission level can be reduced, it is possible to reduce power consumption.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2006-027253 filed on Feb. 3, 2006, the entire contents of which are hereby incorporated by reference.

What is claimed is:

1. A short-range wireless communication device that receives or transmits beacons in a beacon period, allocates a communication-occupied interval in a super-frame between two adjacent beacon periods, and carries out a communication in the communication-occupied interval in conformity with a predetermined protocol, said short-range wireless communication device comprising:

a control unit that dynamically sets and changes a communication rate in the communication-occupied interval and a number of slots constituting the communication-occupied interval, wherein:

the super-frame includes a plurality of communication time slots, the communication-occupied time interval has one or more communication time slots from among the plurality of communication time slots, and said control unit dynamically changes the communication rate by dynamically changing the communication rate per communication time slot of the one or more communication time slots of the communication-occupied time interval.

2. The short-range wireless communication device as claimed in claim 1, wherein the control unit refers to a table stored in the short-range wireless communication device beforehand, changes allocation of the slots constituting the communication-occupied interval in response to the communication rate in the communication-occupied interval, and maintains a communication band to be constant.

3. The short-range wireless communication device as claimed in claim 1, wherein the control unit sets the allocation of the slots constituting the communication-occupied interval to be a possible minimum in response to an amount of data to be transmitted.

4. The short-range wireless communication device as claimed in claim 1, wherein the control unit changes the communication rate in the communication-occupied interval or the allocation of the slots constituting the communication-occupied interval in response to a distance to a device coupled to the short-range wireless communication device through a radio connection.

5. The short-range wireless communication device as claimed in claim 1, wherein the control unit changes a transmission power in response to a distance to a device coupled to the short-range wireless communication device through a radio connection.

6. A short-range wireless communication method, comprising the steps of:

receiving or transmitting beacons in a beacon period;

allocating a communication-occupied interval in a super-frame between two adjacent beacon periods;

carrying out a communication in the communication-occupied interval in conformity with a predetermined protocol; and dynamically setting and changing a communication rate in the communication-occupied interval and a number of slots constituting the communication-occupied interval, wherein:

the super-frame includes a plurality of communication time slots, the communication-occupied time interval has one or more communication time slots from among the plurality of communication time slots, and said dynamically changing the communication rate comprises dynamically changing the communication rate per communication time slot of the one or more communication time slots of the communication-occupied time interval.

7. A recording medium in which a short-range wireless communication program is stored, said short-range wireless communication program being executable on a computer to drive the computer to execute the steps of:

receiving or transmitting beacons in a beacon period;

allocating a communication-occupied interval in a super-frame between two adjacent beacon periods;

carrying out a communication in the communication-occupied interval in conformity with a predetermined protocol; and dynamically setting and changing a communication rate in the communication-occupied interval and a number of slots constituting the communication-occupied interval, wherein:

the super-frame includes a plurality of communication time slots, the communication-occupied time interval has one or more communication time slots from among the plurality of communication time slots, and said dynamically changing the communication rate comprises dynamically changing the communication rate per communication time slot of the one or more communication time slots of the communication-occupied time interval.

* * * * *